(12) United States Patent
Kawamura et al.

(10) Patent No.: US 11,954,772 B2
(45) Date of Patent: Apr. 9, 2024

(54) INFORMATION PROCESSING DEVICE AND IMAGE GENERATING METHOD FOR MANAGING PLACEMENT OF USER IMAGES

(71) Applicant: SONY INTERACTIVE ENTERTAINMENT INC., Tokyo (JP)

(72) Inventors: Daisuke Kawamura, Foster City, CA (US); Ikuo Kobayashi, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/312,515

(22) PCT Filed: Dec. 10, 2019

(86) PCT No.: PCT/JP2019/048248
§ 371 (c)(1),
(2) Date: Jun. 10, 2021

(87) PCT Pub. No.: WO2020/129748
PCT Pub. Date: Jun. 25, 2020

(65) Prior Publication Data
US 2022/0067995 A1    Mar. 3, 2022

(30) Foreign Application Priority Data
Dec. 17, 2018   (JP) ................................. 2018-235707

(51) Int. Cl.
*G06T 11/60*     (2006.01)
*A63F 13/53*    (2014.01)
(Continued)

(52) U.S. Cl.
CPC .............. *G06T 11/60* (2013.01); *A63F 13/53* (2014.09); *A63F 13/537* (2014.09);
(Continued)

(58) Field of Classification Search
CPC ..... G06T 11/60; G06T 19/006; G06F 3/0481; G06F 3/0482; G06F 13/00; A63F 13/655;
(Continued)

(56) References Cited

U.S. PATENT DOCUMENTS 9,889,379 B2 * 2/2018 Nogami ................. A63F 13/795
10,593,155 B2 * 3/2020 Nakamura ........... G07F 17/3244
(Continued)

FOREIGN PATENT DOCUMENTS

JP    2014-226359 A    12/2014
JP    2017-176804 A    10/2017
(Continued)

OTHER PUBLICATIONS

International Search Report and Written Opinion dated Feb. 4, 2020, from PCT/JP2019/048248, 9 sheets.
(Continued)

*Primary Examiner* — Jin Cheng Wang
(74) *Attorney, Agent, or Firm* — XSENSUS LLP

(57) ABSTRACT

An acquisition unit 104 acquires from a server a status of a friend user. A menu image generation unit 110 generates a menu image including an icon. A user image placement unit 116 places, on the periphery of the icon, images of friend users whose statuses acquired by the acquisition unit 104 are related to the icon. The icon is an icon representing content, and the user image placement unit 116 places, on the periphery of the icon, an image of a friend user currently performing the content.

19 Claims, 10 Drawing Sheets

(51) Int. Cl.
  *A63F 13/537* (2014.01)
  *A63F 13/655* (2014.01)
  *A63F 13/79* (2014.01)
  *A63F 13/795* (2014.01)
  *A63F 13/85* (2014.01)
  *G06F 3/0481* (2022.01)
  *G06F 3/0482* (2013.01)
  *G06T 19/00* (2011.01)

(52) U.S. Cl.
  CPC ............ *A63F 13/655* (2014.09); *A63F 13/79* (2014.09); *A63F 13/795* (2014.09); *A63F 13/85* (2014.09); *G06F 3/0481* (2013.01); *G06F 3/0482* (2013.01); *G06T 19/006* (2013.01)

(58) Field of Classification Search
  CPC .......... A63F 13/53; A63F 13/79; A63F 13/85; A63F 2300/5546; A63F 13/35; A63F 13/73; A63F 13/48; A63F 13/795
  See application file for complete search history.

(56) References Cited

U.S. PATENT DOCUMENTS

| | | | | |
|---|---|---|---|---|
| 11,071,915 | B2* | 7/2021 | Black | G10L 17/22 |
| 2010/0029370 | A1* | 2/2010 | Robinson | G07F 17/3295 |
| | | | | 463/30 |
| 2012/0054691 | A1* | 3/2012 | Nurmi | G06F 16/951 |
| | | | | 715/854 |
| 2013/0321451 | A1* | 12/2013 | Nogami | A63F 13/25 |
| | | | | 345/619 |
| 2013/0324234 | A1* | 12/2013 | Nogami | A63F 13/77 |
| | | | | 463/29 |
| 2013/0326370 | A1* | 12/2013 | Nogami | G06F 16/9577 |
| | | | | 715/753 |
| 2013/0326382 | A1* | 12/2013 | Nogami | G06F 16/9577 |
| | | | | 715/765 |
| 2013/0326409 | A1* | 12/2013 | Nogami | G06F 16/9577 |
| | | | | 715/810 |
| 2013/0326410 | A1* | 12/2013 | Nogami | G06F 16/9577 |
| | | | | 715/810 |
| 2013/0326510 | A1* | 12/2013 | Adekile | G06F 11/0793 |
| | | | | 718/1 |
| 2014/0274358 | A1* | 9/2014 | Hoskins | A63F 13/87 |
| | | | | 463/29 |
| 2014/0349749 | A1* | 11/2014 | Nogami | A63F 13/795 |
| | | | | 463/31 |
| 2016/0196584 | A1* | 7/2016 | Franklin | G06F 3/04817 |
| | | | | 715/745 |
| 2016/0314027 | A1* | 10/2016 | Iwaya | G06F 9/542 |
| 2016/0317924 | A1* | 11/2016 | Tanaka | H04L 67/01 |
| 2017/0187987 | A1* | 6/2017 | Mukai | H04N 7/147 |
| 2018/0169528 | A1* | 6/2018 | Hinoshita | A63F 13/795 |
| 2020/0219300 | A1* | 7/2020 | Ishikawa | G06F 3/0481 |
| 2021/0097488 | A1* | 4/2021 | Hirasawa | G06V 40/172 |
| 2021/0158781 | A1* | 5/2021 | Imamura | G06Q 50/01 |

FOREIGN PATENT DOCUMENTS

| | | |
|---|---|---|
| WO | 2012/096013 A1 | 7/2012 |
| WO | 2014/068806 A1 | 5/2014 |

OTHER PUBLICATIONS

International Preliminary Report on Patentability dated Jul. 1, 2021, from PCT/JP2019/048248, 15 sheets.

* cited by examiner

FIG. 6
(a)
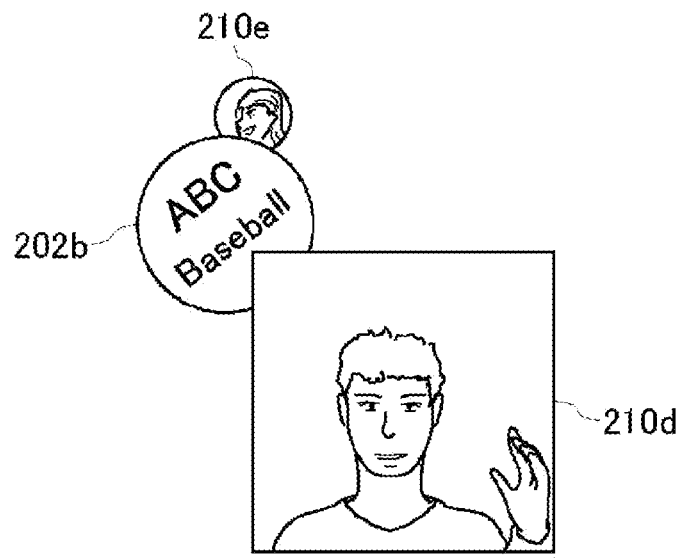
(b)
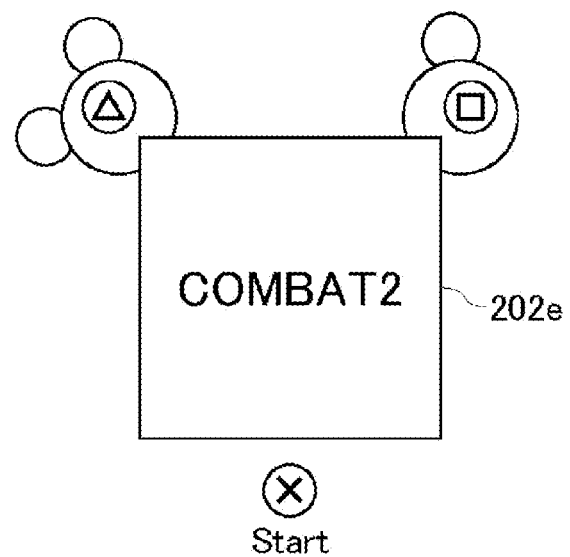

INFORMATION PROCESSING DEVICE AND IMAGE GENERATING METHOD FOR MANAGING PLACEMENT OF USER IMAGES

TECHNICAL FIELD

The present invention relates to a technique for generating images such as a menu image containing icons.

BACKGROUND ART

An information processing device such as a game device causing a menu screen for providing a user with information to be displayed on its display. In general, a menu screen has icons which are GUI (graphical user interface) arranged thereon, and the user selects an icon to cause the information processing device to execute a function corresponding to the selected icon. For example, a menu screen for content selection by the user has a plurality of icons representing the respective pieces of content arranged thereon. When the user selects an icon, the content corresponding to the selected icon is activated.

CITATION LIST

Patent Literature

[PTL 1]
WO 2014/068806

SUMMARY

Technical Problem

According to a game network service, the user registers a specific user as a "friend" to a management server. As a result, information related to the friend collected by the management server is distributed to a game device of the user. The game device then displays on a display a friend profile screen including a game playing status, a content purchase history, and the like, by the friend. The user views the current status and past status (past action history) of the friend. After finding that the friend is currently playing the game, the user can offer a gameplay, asking the friend to play the game together.

The menu screen that the game device presents to the user is basically generated on a purpose basis. For example, a content selection screen is generated to allow the user to select content. A friend profile screen is generated to allow the user to view information related to a friend. Generating a menu screen on a purpose basis enables the user to operate an input device to make a transition of the menu screen, thereby causing an intended menu screen according to a purpose to be displayed.

However, if a transition operation to reach the intended menu screen is complicated or requires a lot of operations, it may reduce the user's motivation to display the menu screen to achieve his/her purpose.

Therefore, an object of the present invention is to provide a technique for generating display images that are convenient to users.

Solution to Problem

To solve the above problem, the information processing device according to an aspect of the present invention is an information processing device that connects to a server that manages statuses of a plurality of users, the information processing device including an acquisition unit configured to acquire a status of each user from the server, and an image generation unit configured to generate an image including an icon. The image generation unit includes a user image placement unit that places, on a periphery of the icon, an image of the user the acquired status of which is related to the icon.

Another aspect of the present invention is an image generating method. The image generating method includes a step of acquiring a status of a user from a server, and a step of generating an image including an icon, the image having an image of the user the acquired status of which is related to the icon placed on a periphery of the icon.

It should be noted that any combination of the above-described components and any expressions of the present invention converted between a method, a device, a system, a recording medium, a computer program, and the like are also effective as modes of the present invention.

BRIEF DESCRIPTION OF DRAWINGS

FIGS. 6(a) and 6(b) each depict a diagram in which friend images are placed on the periphery of an icon.

DESCRIPTION OF EMBODIMENT

Figure 1:
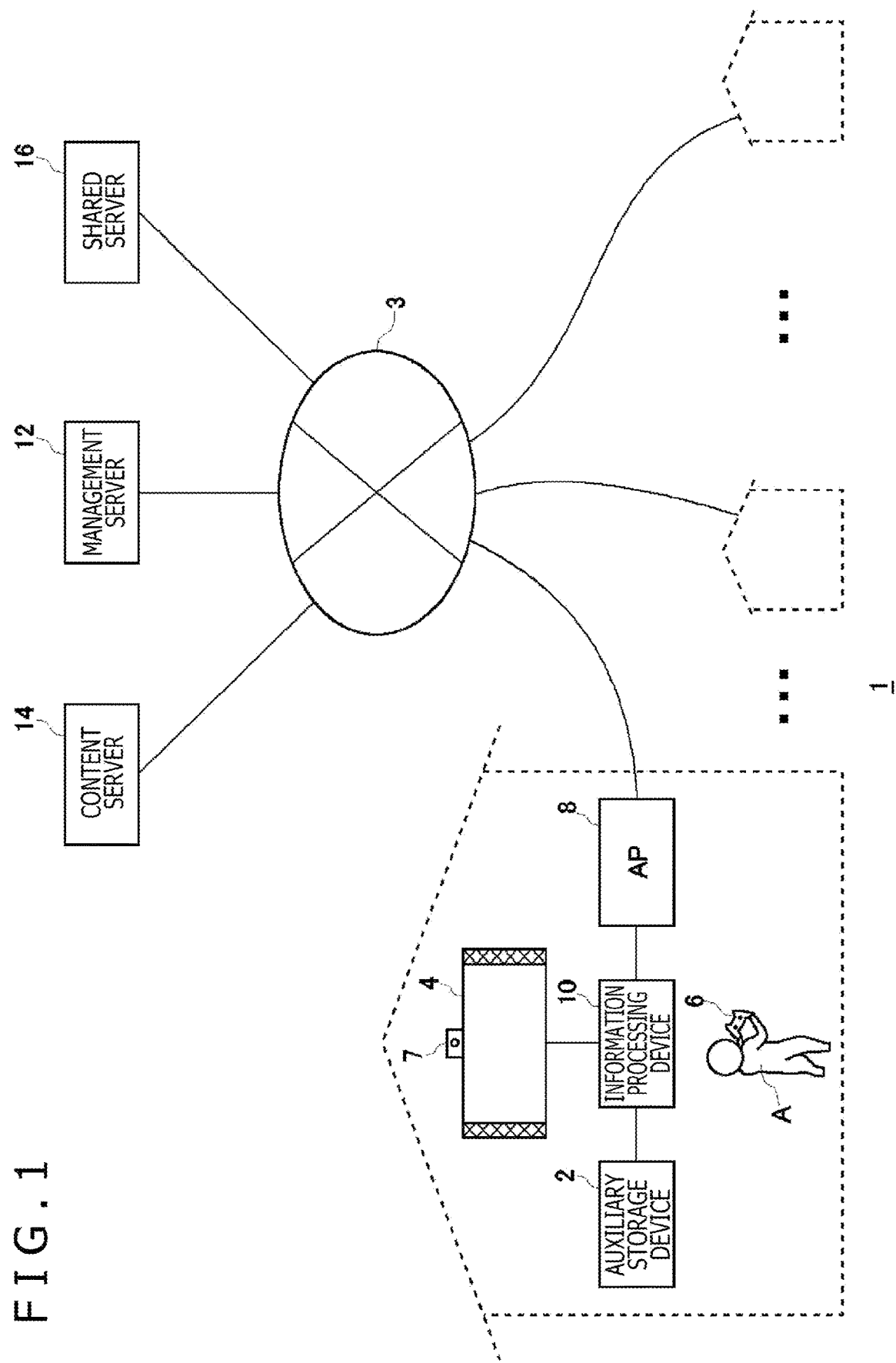
FIG. 1 depicts an information processing system according to an embodiment.

FIG. 1 depicts an information processing system 1 according to the embodiment of the present invention. The information processing system 1 according to the embodiment provides a user with an at least game-related network service. The information processing system 1 includes a plurality of information processing devices 10 operated by a plurality of respective users, a management server 12, a content server 14, and a shared server 16, which are connected to a network 3 such as the Internet. Each information processing device 10 is communicatively connected to the management server 12, the content server 14, and the shared server 16 on the network 3 via an access point (hereinafter referred to as "AP") 8. FIG. 1 depicts the information processing device 10 operated by a user A.

The input device 6 is connected wired or wirelessly to the information processing device 10, receives operation input from the user A, and supplies the operation information to the information processing device 10. The information processing device 10 reflects the operation information received from the input device 6 on processes performed by system software or application software and causes an output device 4 to output processed results. The information processing device 10 in the embodiment is a game device for executing game software. The input device 6 may be a device such as a game controller, which supplies the operation information regarding the user A to the information processing device 10. Note that the information processing device 10 may execute application software other than game software. The input device 6 includes a plurality of input units, such as a plurality of push-type operation buttons, an analog stick capable of inputting an analog amount, and a rotary button.

Auxiliary storage device 2 is a large-capacity storage device such as an HDD (hard disk drive) or a flash memory and may be an external storage device that is to be connected to the information processing device 10 via, for example, a USB (Universal Serial Bus) or a built-in storage device. The output device 4 may be a television including a display for outputting images and a speaker for outputting audio. The output device 4 may be connected to the information processing device 10 wirelessly or via a wired cable. The camera 7 is a stereo camera, which captures a space around the output device 4.

The management server 12 provides a plurality of users with a network service and collects and manages the users' statuses. The management server 12 manages a network account for identifying each user who uses the network service. Each user signs in the network service using the network account. In a state in which the user has signed in the network service, the user can register, in the management server 12, saved data of a game, and a virtual award (trophy) the user has got during a game play.

The management server 12 keeps, in a user DB (database), profile information such as a user icon, a nickname (online ID (identification)) of a user used on the network, and a signing-in password of a user in association with the network account. The user icon is an avatar image for representing the user and can be a photograph of the user or a painted picture. Alternatively, the user icon may be a photograph or a painted picture that is unrelated to the user. In short, the user icon in the embodiment may be any image that the user has set to represent himself/herself on the network. Each user uses his/her user icon to communicate with other users.

In the network service, the user A can send another user a request for becoming friends. If the other user accepts the request, the user A can become friends with the other user. A process to register friends is performed in the management server 12, and the management server 12 registers the friend in association with the network account of the user A.

The management server 12 monitors the statuses of the information processing devices 10 of all users who have signed in, detects and records any change in their statuses. In a case where a predetermined event occurs during a gameplay of a certain user, the management server 12 may notify another user who is a friend of the user of the occurrence of the event as information concerning the user's status. For example, in a case where the user has got a trophy during the gameplay, the management server 12 may notify the other user who is a friend of the user that the user has got a trophy. Note that, when the management server 12 receives from the user a request for information concerning the status of other users who are friends of the user, the server 12 may collectively send the requested information concerning the statuses of the other users who are friends of the user to the information processing device 10 of the user.

The content server 14 provides the user with content data. The content data in the embodiment is game software. The content server 14 provides the user A with purchase image data regarding content which can be provided in response to a request for a purchase screen sent from the information processing device 10. The information processing device 10 causes the output device 4 to display the content purchase screen. The content purchase screen includes a plurality of content icons. If the user A selects one of the content icons, the content server 14 accepts a purchase from the user A, and provides the purchased content data to the information processing device 10.

The shared server 16 provides a sharing service of game images. The user A can provide the shared server 16 with a moving image during gameplay in real time. The shared server 16 distributes by streaming the moving image of the gameplay to viewing users. The shared server 16 also has a function of distributing past moving image of gameplay by the user A to viewing users. Note that the user A can be a viewing user to view a moving image of gameplay by the other user.

Figure 2:
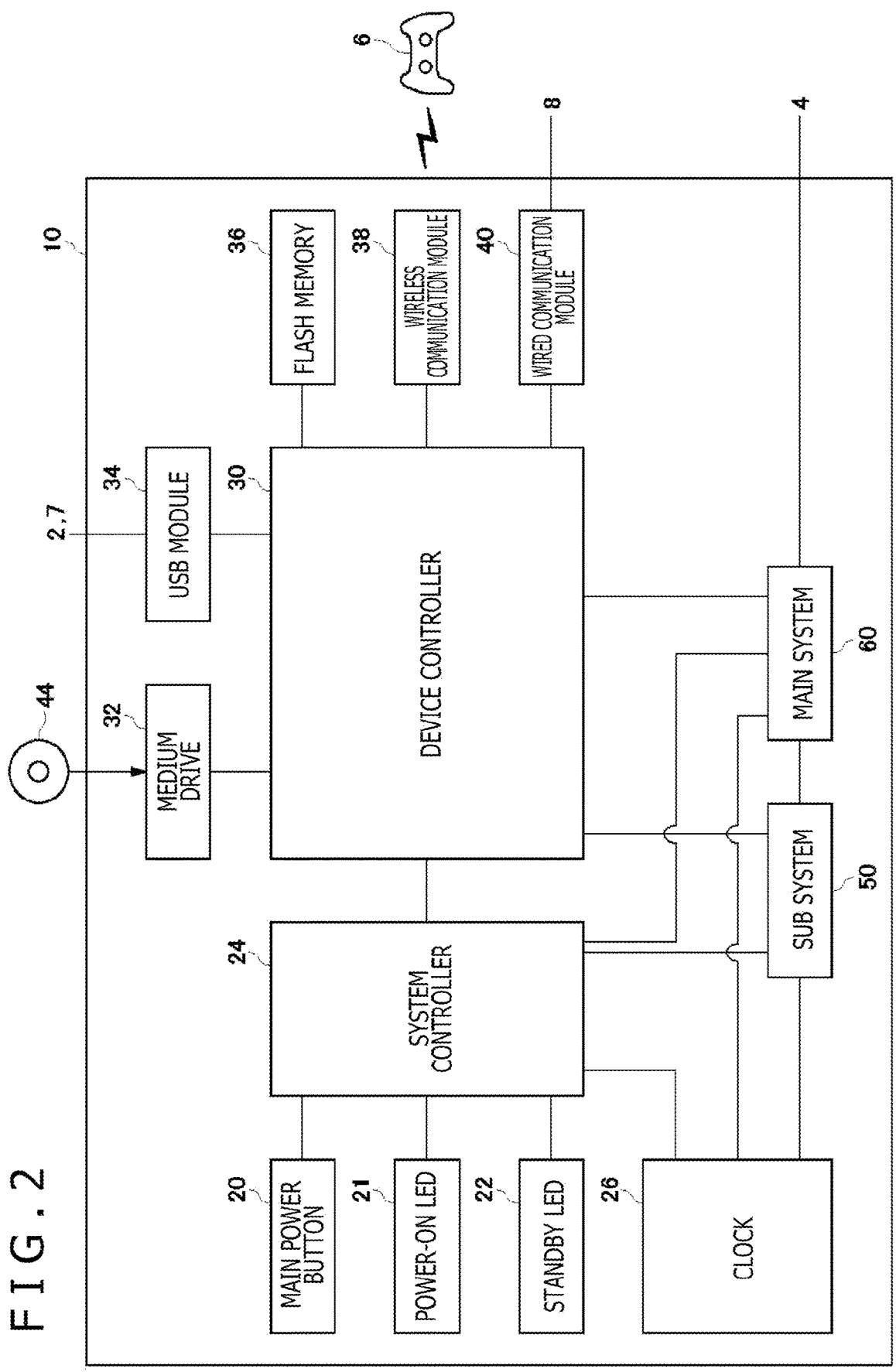
FIG. 2 depicts a hardware configuration of an information processing device.

FIG. 2 depicts a hardware configuration of the information processing device 10. The information processing device 10 includes a main power button 20, a power-on LED (light-emitting diode) 21, a standby LED 22, a system controller 24, a clock 26, a device controller 30, a media drive 32, a USB module 34, a flash memory 36, a wireless communication module 38, a wired communication module 40, a subsystem 50, and a main system 60.

The main system 60 includes a main CPU (Central Processing Unit), a memory serving as a main storage device, a memory controller, a GPU (Graphics Processing Unit), and the like. The GPU is mainly used for a computing process of a game program. These functions may be formed on a single chip, serving as System-on-a-chip. The main CPU has a function of executing a game program recorded in the auxiliary storage device 2 or in a ROM medium 44.

The subsystem 50 includes a sub CPU, a memory serving as a main storage device, and a memory controller. The subsystem 50 does not include a GPU for executing a game program. The sub CPU has a fewer circuit gates and lower operational power consumption than the main CPU. The sub CPU operates even when the main CPU is in a standby state, and performs limited processing functions so as to reduce the power consumption.

The main power button 20 is an input unit for receiving an operation input from the user and is provided on a front surface of a housing of the information processing device 10 to be operated to switch on/off the power supply to the main system 60 of the information processing device 10. The power-on LED 21 lights up when the main power button 20 is turned on whereas the standby LED 22 lights up when the main power button 20 is turned off.

The system controller 24 detects that the user presses the main power button 20. If the main power button 20 is pressed while the main power supply is in the OFF state, the system controller 24 acquires the pressing operation as the "ON instruction." Meanwhile, if the main power button 20 is pressed while the main power supply is in the ON state, the system controller 24 acquires the pressing operation as the "OFF instruction."

The clock 26 is a real-time clock to generate the current date and time information and to provide it to the system controller 24, the subsystem 50, and the main system 60. The device controller 30 is an LSI (Large-Scale Integrated Circuit) for executing information transfer among devices, such as a south bridge. As depicted in the drawing, the device controller 30 is connected to devices such as the system controller 24, the media drive 32, the USB module 34, the flash memory 36, the wireless communication module 38, the wired communication module 40, the subsystem 50, and the main system 60. The device controller 30 absorbs a difference in electrical characteristics and a difference in data transfer rate between these devices, thereby controlling a data transfer timing.

The media drive 32 is a driving device to be mounted with the ROM medium 44 having application software such as a game and license information recorded therein. The media drive 32 reads programs, data, etc. from the ROM medium 44. The ROM medium 44 may be a read-only recording medium such as an optical disc, a magnet-optical disk, or a Blu-ray disc.

The USB module 34 is a module connectable to an external device via a USB cable. The USB module 34 may be connected to the auxiliary storage device 2 and the camera 7 via USB cables. The flash memory 36 is an auxiliary storage device constituting an internal storage. The wireless communication module 38 performs wireless communication with, for example, the input device 6 via communication protocol such as Bluetooth (registered trademark) protocol or IEEE (Institute of Electrical and Electronic Engineers) 802.11 protocol. The wired communication module 40 performs wired communication with an external device and is connected to the network 3 via the AP 8.

Figure 3:
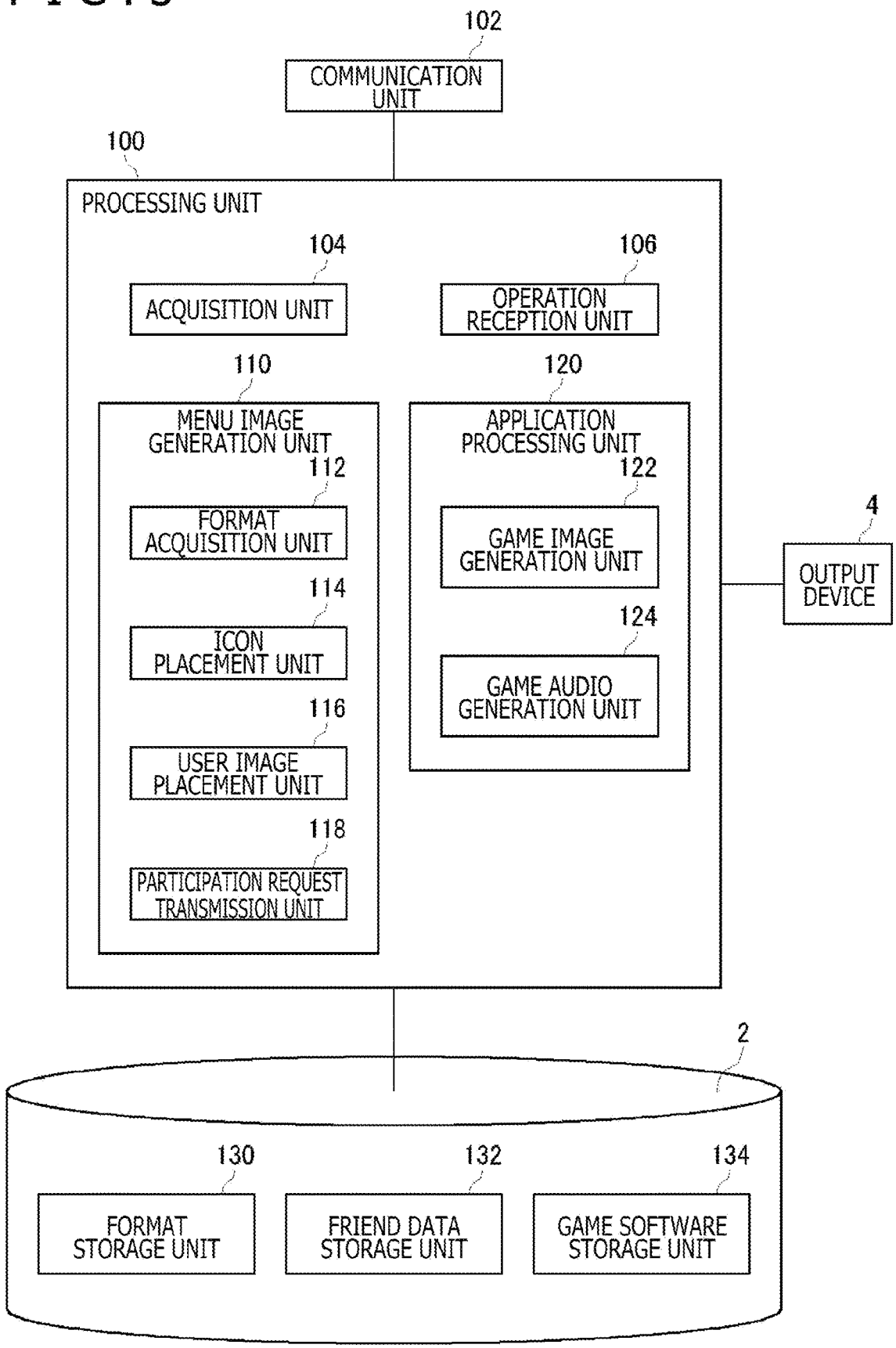
FIG. 3 is a functional block diagram of the information processing device.

FIG. 3 depicts functional blocks of the information processing device 10. The information processing device 10 includes a processing unit 100 and a communication unit 102. The processing unit 100 includes an acquisition unit 104, an operation reception unit 106, a menu image generation unit 110, and an application processing unit 120. The menu image generation unit 110 has a function of generating a menu image and includes a format acquisition unit 112, an icon placement unit 114, a user image placement unit 116, and a participation request transmission unit 118. The application processing unit 120 has a function of executing an application such as a game and includes a game image generation unit 122 and a game audio generation unit 124.

The components illustrated as functional blocks for performing various processing operations in FIG. 3 can be configured by hardware such as a circuit block, a memory, and another LSI, or implemented by software such as system software, and a game program loaded into the memory. Thus, it will be understood by those skilled in the art that these functional blocks may be variously implemented by hardware only, by software only, or by a combination of hardware and software. The functional blocks are not limited to any of these.

The communication unit 102 combines the functions of the wireless communication module 38 and the wired communication module 40 depicted in FIG. 2. The communication unit 102 receives operation information from the user A through the input unit of the input device 6. After receiving the operation information, the operation reception unit 106 supplies it to either the menu image generation unit 110 or the application processing unit 120. The communication unit 102 also exchanges information or data to/from the management server 12, the content server 14, and the shared server 16 via the AP 8.

The menu image generation unit 110 is achieved by system software, generates a menu image to be displayed by the output device 4. The menu image generation unit 110 has the function of generating various menu images. In the following example, however, the menu image generation unit 110 generates a game selection image in which the user A selects a game to play.

The auxiliary storage device 2 includes a format storage unit 130, a friend data storage unit 132, and a game software storage unit 134. The format storage unit 130 stores formats (layouts) for a plurality of menu images. The friend data storage unit 132 stores different data associated with another user who is a friend of the user A (hereinafter referred to also as a "friend" or "friend user"). The friend data includes at least the icon of a friend user (user image) and may further include his/her nickname on the network (online ID). When a friend relationship is established between the user A and another user, the acquisition unit 104 acquires profile data including a user icon and an online ID of the friend from the management server 12. The acquisition unit 104 then stores the data to the friend data storage unit 132. The game software storage unit 134 stores game software. The game software includes a game program and image data (icon data) representing the game.

Upon receiving an instruction to display a game selection screen from the input device 6, the format acquisition unit 112 acquires a format for the game selection image from the format storage unit 130. The game selection screen includes a format in which game icons representing game titles are arranged in a single column and the game icon in a predetermined position is displayed larger than the other game icons. The icon placement unit 114 acquires the icon data of the game from the game software storage unit 134 and places the icons according to the format. Thus, the menu image generation unit 110 generates images including icons.

Figure 4:
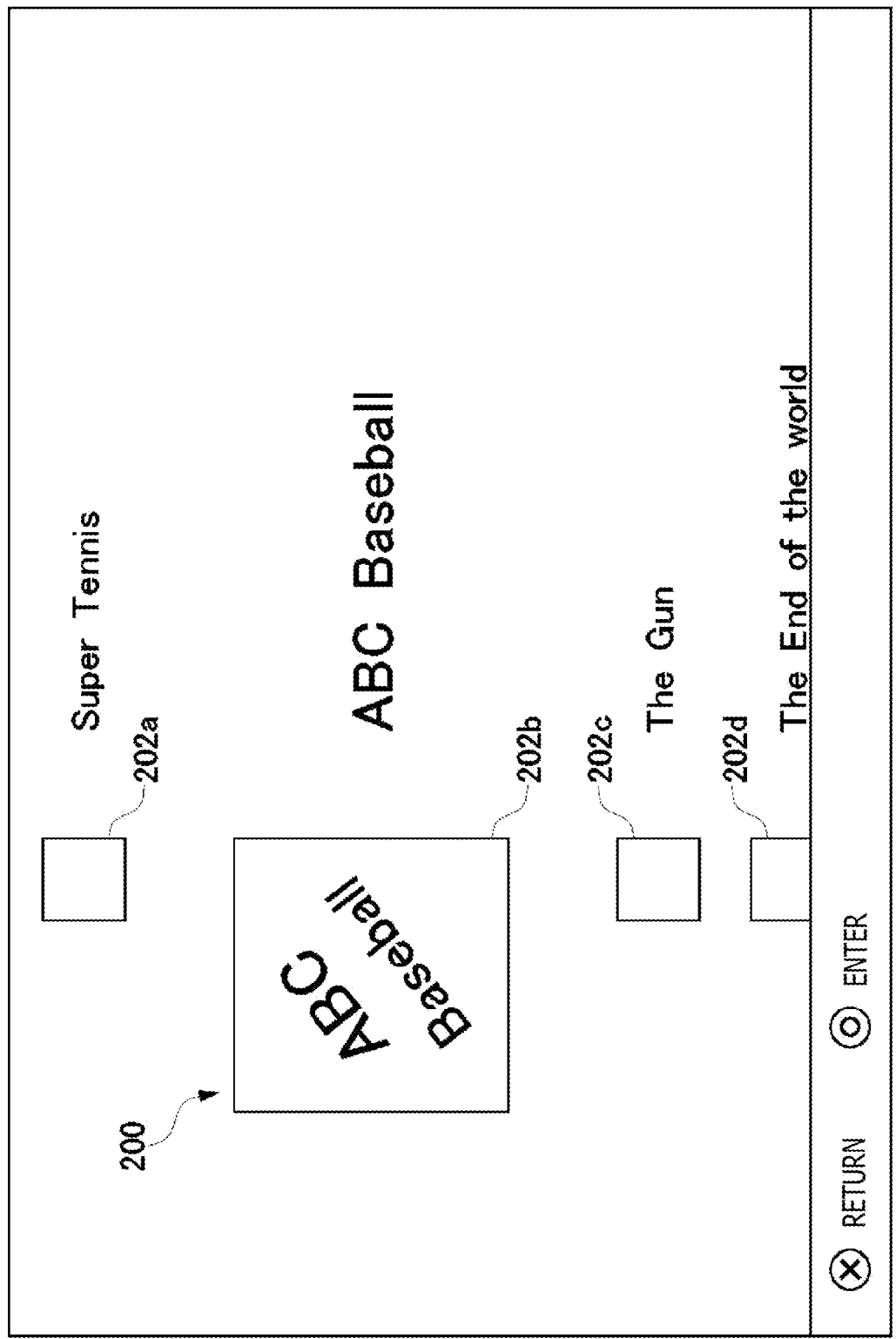
FIG. 4 depicts an example of a game selection screen to be displayed on a display.

FIG. 4 depicts an example of the game selection screen to be displayed on the display. This game selection screen includes a plurality of game icons 202a, 202b, 202c, and 202d arranged vertically and the titles of the games depicted on the right side of the game icons 202. When the user presses the up button or the down button of the input device 6, the icon placement unit 114 moves the game icon upward or downward, respectively.

The game icon 202b displayed in a focus area 200 is displayed in an enlarged scale. When the user presses an enter button of the input device 6, the game icon 202b in the focus area 200 is selected. This makes the application processing unit 120 activate the game software corresponding to the game icon 202b. In the application processing unit 120, the game image generation unit 122 generates a game image, and the game audio generation unit 124 generates a game audio.

Different users enjoy a game differently; some users like playing it alone, and other users like playing it with friend users. Users who like playing alone may want to play with other users if they find that their close friends are currently playing the game. The user can make a transition of the display screen from the game selection screen to the friend profile screen and check the friend's current status. However, users who are unfamiliar with the screen-transition operation takes time to display the friend profile screen, and even users who are familiar with the transition operation may feel that it is troublesome.

To overcome this inconvenience, the menu image generation unit 110 in the embodiment generates menu images that are convenient to users. More specifically, the menu image generation unit 110 places, on the periphery of each game icon 202, the images of friends whose present or past statuses are related to each game icon 202. This achieves a user interface that allows the user to recognize the friends related to each game icon 202 at a glance.

Figure 5:
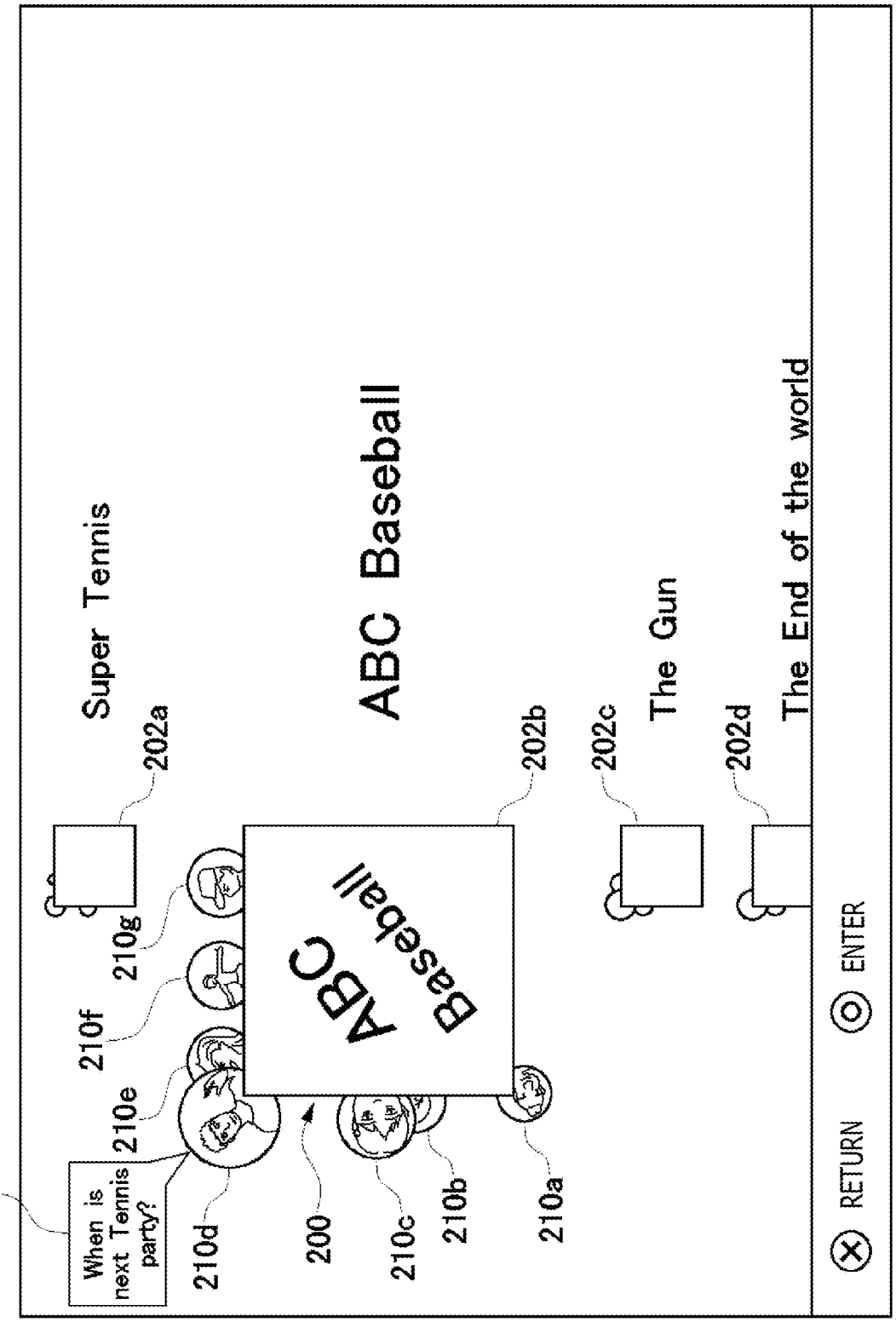
FIG. 5 depicts the game selection screen to be displayed in the embodiment.

FIG. 5 depicts an example of the game selection screen to be displayed on the output device 4 in the embodiment. Similar to FIG. 4, the game selection screen of the embodiment includes the plural game icons 202a, 202b, 202c, and 202d arranged vertically, and the titles of the games depicted on the right side of the game icons 202. The user operates the up button or the down button of the input device 6, so that the game icon to be displayed can be changed.

Upon display the game selection screen, the acquisition unit 104 acquires from the management server 12 the status of at least one user who is in the network service. In the embodiment, when the operation reception unit 106 receives a request for displaying the game selection screen from the user A, the acquisition unit 104 may acquire from the management server 12 the status of the friend user who is a friend of the operation user (user A) operating the information processing device 10. The status of the friend user may include the current and past statuses, such as whether he/she is online or not, the title of the game he/she is currently playing, and his/her play history.

Note that the management server 12 may send the information processing device 10 the latest status of the friend user every time the friend user's status is updated. In this case, the acquisition unit 104 continuously acquires both the latest and past statuses of the friend user.

The user image placement unit 116 places, on the periphery of each game icon 202, the images of friend users whose statuses acquired by the acquisition unit 104 are related to each game icon 202. In the game selection screen depicted in FIG. 5, the friend images 210 are avatar images of friend users. The user image placement unit 116 places, on the periphery of each game icon 202, the friend images 210 of the friend users currently playing the game whose title is specified by each game icons 202. At this time, it is preferable that the friend images 210 do not overlap on each game icon 202, so that each game icon 202 can be entirely kept visible.

Placing the friend images 210 on the periphery of the game icons 202 enables the user A to recognize the friend users currently playing the game at a glance. The user image placement unit 116 may place a plurality of friend images 210 in an overlapping manner. Accordingly, even a large number of friend images to be displayed are present, it becomes possible to place the friend images on the periphery of the game icon 202. Although the overlapping portions of the friend images 210 are unseen, the user image placement unit 116 preferably overlaps the friend images 210, making at least more than half of each image visible such that the user A can recognize the friend users specified by the friend images 210.

Note that the user image placement unit 116 may adjust sizes of the friend images 210 according to the relationship between the user A and each friend user. For example, when the management server 12 calculates the closeness between the user A and friend users, the friend images 210 of friend users with higher closeness may be displayed larger than the friend images 210 of friend users with lower closeness. The management server 12 may calculate and update daily the closeness between the user A and each friend user, considering the number of message exchanges or a period of time in which they have played together.

When the number of friend images 210 to be displayed exceeds a first predetermined number, the user image placement unit 116 may place the first predetermined number of friend images 210 on the periphery of the corresponding game icon 202 and may make the friend images 210 exceeding the first predetermined number hidden from view. The user image placement unit 116 may preferentially display the friend images 210 of friend users with high closeness.

The user image placement unit 116 places friend-related information 216 regarding friend users in the vicinity of the friend images 210. In FIG. 5, the friend-related information 216 is a message made by a friend user and may alternatively be other information related to this friend user. For example, the friend-related information 216 may be information indicating that the friend user has got a trophy, or information indicating that the friend user is currently voice chatting. The status of the friend user that the acquisition unit 104 acquires may include such friend user-related information as described above.

The user image placement unit 116 preferably places the friend-related information 216 in association with each friend image 210. However, when the number of friend images 210 is large, the friend-related information 216 cannot be placed close to the corresponding friend image 210, so that the user cannot easily recognize their correspondence between the corresponding friend image 210 and the friend-related information 216. To overcome this situation, when the number of friend images 210 exceeds a second predetermined number, the user image placement unit 116 may display the second predetermined number of items of the friend-related information 216 and may make the items exceeding the second predetermined number hidden from view. At this time, the user image placement unit 116 may preferentially display the items of the friend-related information 216 of friend users with higher closeness. Note that the second predetermined number does not exceed the first predetermined number and is preferably smaller than the first predetermined number.

In this example, there are seven friend images 210a to 210g placed on the periphery of the game icon 202b. This indicates that seven friend users specified by the friend images 210a to 210g are playing the game named "ABC Baseball."

The user image placement unit 116 may classify the plurality of friend users related to each game icon 202 into a plurality of groups and may place the friend images in the areas of the respective groups. In the example depicted in FIG. 5, there are seven friend images 210a to 210g placed on the periphery of game icon 202b. The user image placement unit 116 places user images belonging to the same group in an overlapping manner, and user images belonging to other groups are placed apart from each other. In this example, the friend user with the friend image 210a, the friend user with the friend image 210f, and the friend user with the friend image 210g each form a group including a single user. Meanwhile, the friend users with the friend images 210b and 210c, and the friend users with the friend images 210d and 210e each form a group including two users. A group including a plurality of users is a group in which a plurality of friend users is playing a game together.

The user image placement unit 116 places the friend images 210 on a group basis, so that the user A can recognize a play environment in which friend users are currently playing the "ABC Baseball." The user A can recognize the members of each group at a glance and easily select the group to join. Note that, when the user A selects any one of the friend images 210, the participation request transmission unit 118 sends the management server 12 a request for joining the game so as to join the group to which the friend user belongs. The management server 12 transfers the request for joining the game to the selected friend user. When the friend user accepts the request, the user A can join the group.

The user image placement unit 116 may display the friend-related information 216 regarding friend users who are the members of the group in association with the group.

The user image placement unit 116 may display the friend-related information 216 regarding one member in association with the group.

Note that, on the game selection screen, the images of friend users currently playing the game are placed also on the periphery of the game icons 202 except the game icon 202b, or in other words, on the periphery of the game icons 202a, 202c, and 202d. The sizes of the friend images displayed on the periphery of the game icons 202a, 202c, and 202d are smaller than the friend images 210 displayed on the periphery of the game icon 202b. It is, however, preferable that all the friend images 210 are displayed at least large enough for the user A to specify them.

In the foregoing, there has been indicated an example where the friend images 210 are placed on the periphery of the game icons 202. The icon placed in a center is not limited to one of the game icons 202 and may alternatively be, for example, the user icon of the user A. The icon placement unit 114 may place the friend images 210 on the periphery of the icon of the user A, and when the user A selects any one of the friend images, it may be configured such that the current status of the friend user is displayed in the form of text.

FIG. 6(a) depicts a diagram in which the friend image 210e is placed on the periphery of the friend image 210d. For example, the user image placement unit 116 places the game icon 202b of "ABC Baseball" which the friend user is currently playing in such a manner that the game icon 202b is in contact with the friend image 210d displayed in the friend profile screen. The user image placement unit 116 also places the friend image 210e of a friend currently playing with the friend user in such a manner that the friend image 210e is in contact with the game icon 202b. Note that, when the group includes a user other than the friends of the user A, the user image placement unit 116 may place, on the periphery of the game icon 202b, marks (e.g., dots) indicating the presence of the users other than the friends. This allows the user A to roughly recognize the total number of members of the group which the friend user belongs to.

FIG. 6(b) depicts an example where a shortcut is assigned to each group. For example, the group at the upper left corner of the game icon 202e is assigned with an operation button with a triangle on it whereas the group at the upper right corner of the game icon 202e is assigned with an operation button with a square on it. If the user A operates the triangle button of the input device 6, the participation request transmission unit 118 sends the management server 12 a request for joining the group. The management server 12 transfers the request to a friend user of the selected group. If the friend user accepts the request, the user A can join the group. Thus, setting the shortcut enables the user A to select the group easily.

Note that, when the number of groups is large, a shortcut to display a group list may be set. When the user A operates an operation button to display the group list, the menu image generation unit 110 displays the group list including information related to the plurality of groups. The user A may select a group from the group list, and the participation request transmission unit 118 may send the management server 12 a request for joining the group.

Figure 7:
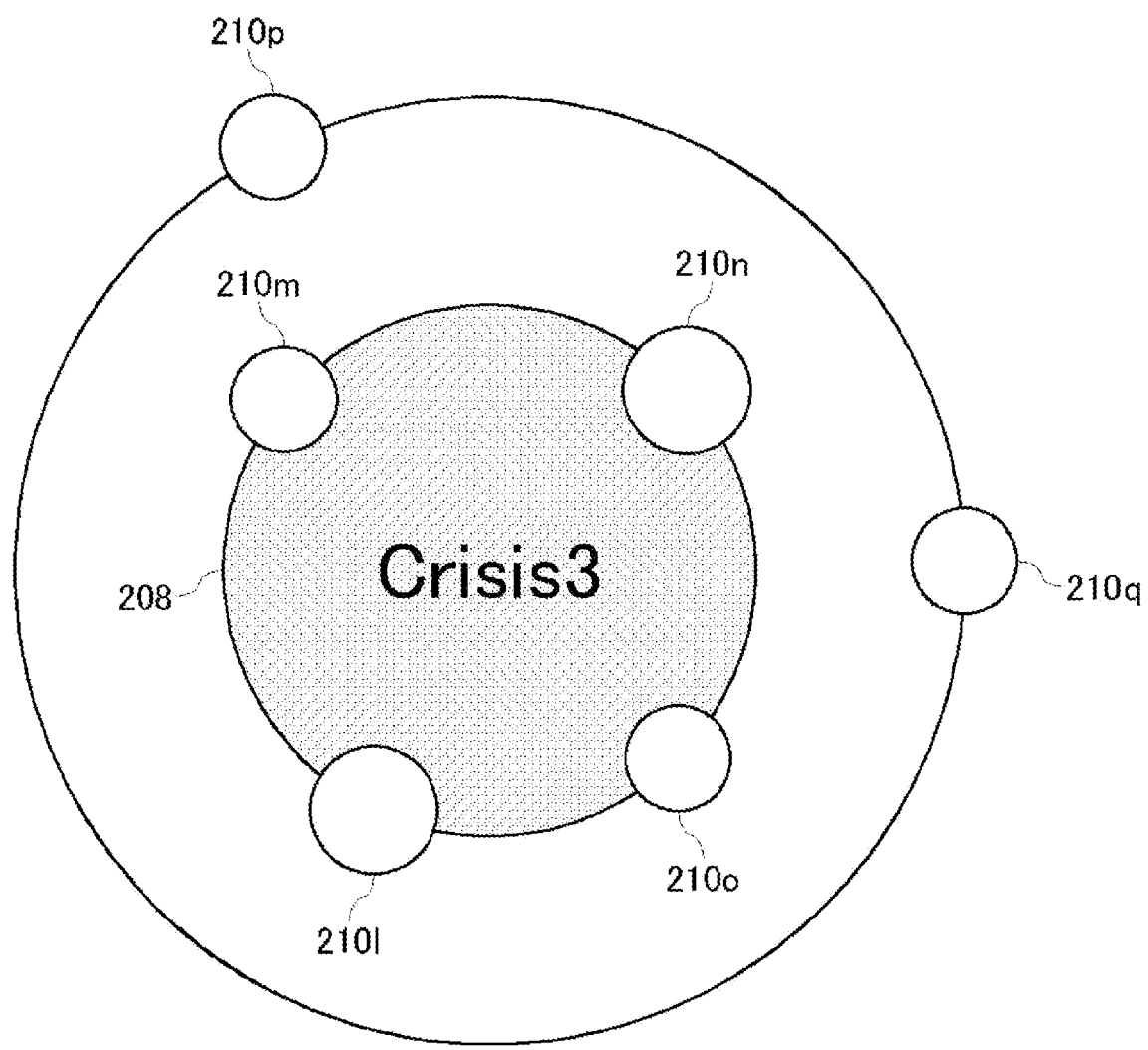
FIG. 7 depicts another diagram in which friend images are placed on the periphery of an icon.

FIG. 7 indicates a state in which the friend images 210 are placed on the periphery of a session icon 208. The session icon 208 is an icon to specify a session of the game that a plurality of users is playing together. Users can join a game session either as a player or as a viewer who watches the game.

The user image placement unit 116 places, on the periphery of the session icon 208, the images of friends who are in the game session. Here, the user image placement unit 116 places, in contact with the session icon 208, friend images 210l, 210m, 210n, and 210o of friends who are in the game session as players, and places friend images 210p and 210q of friends who are viewers, at a position not in contact with the session icon 208 so as to surround the session icon 208. Note that, in the example depicted in FIG. 7, the friend images 210 are partly layered on the session icon 208. Alternatively, however, as depicted in FIG. 5, the session icon 208 may be partly layered the friend images 210.

The user image placement unit 116 classifies the users related to the session icon 208 and determines the positions of their friend images 210 according to the classified results. The classification of users is based on a predetermined criterion of importance; the images of friends with high importance are placed closer to the session icon 208 than the images of friends with low importance. Concerning a game session, players are set with higher importance than viewers. Hence, the user image placement unit 116 places the friend images 210l, 210m, 210n, and 210o of the players close to the session icon 208, and places the friend images 210p and 210q of the viewers far from the session icon 208, so that the user A can recognize the classification between the players and the viewers intuitively.

The user A can access the shared server 16 to view moving images that other users are distributing. The user A makes the output device 4 display thereon a moving-image selection screen including a plurality of moving-image icons and selects a moving image the user A wants to view.

Figure 8:
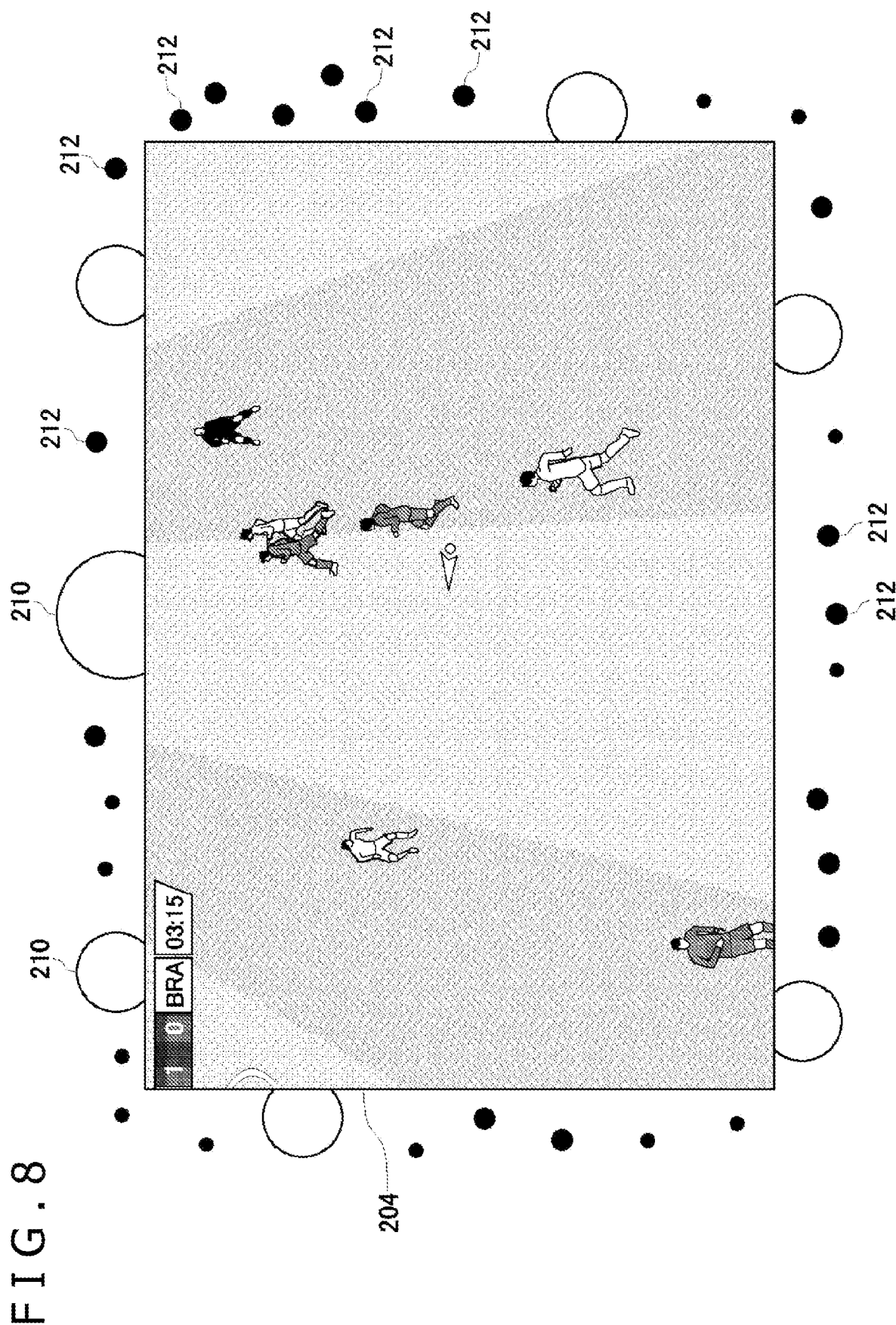
FIG. 8 depicts another diagram in which friend images are placed on the periphery of an icon.

FIG. 8 indicates a state in which friend images 210 are placed on the periphery of a moving-image icon. On the moving-image selection screen, the user image placement unit 116 places, on the periphery of each moving-image icon 204, the friend images 210 of friend users currently viewing the moving image. This enables the user A to recognize the friend users currently viewing the moving image. In addition, the user image placement unit 116 uses dots 212 to represent users other than the friends of the user A. The user A can estimate the total number of moving-image viewers according to the density of the dots 212.

Figure 9:
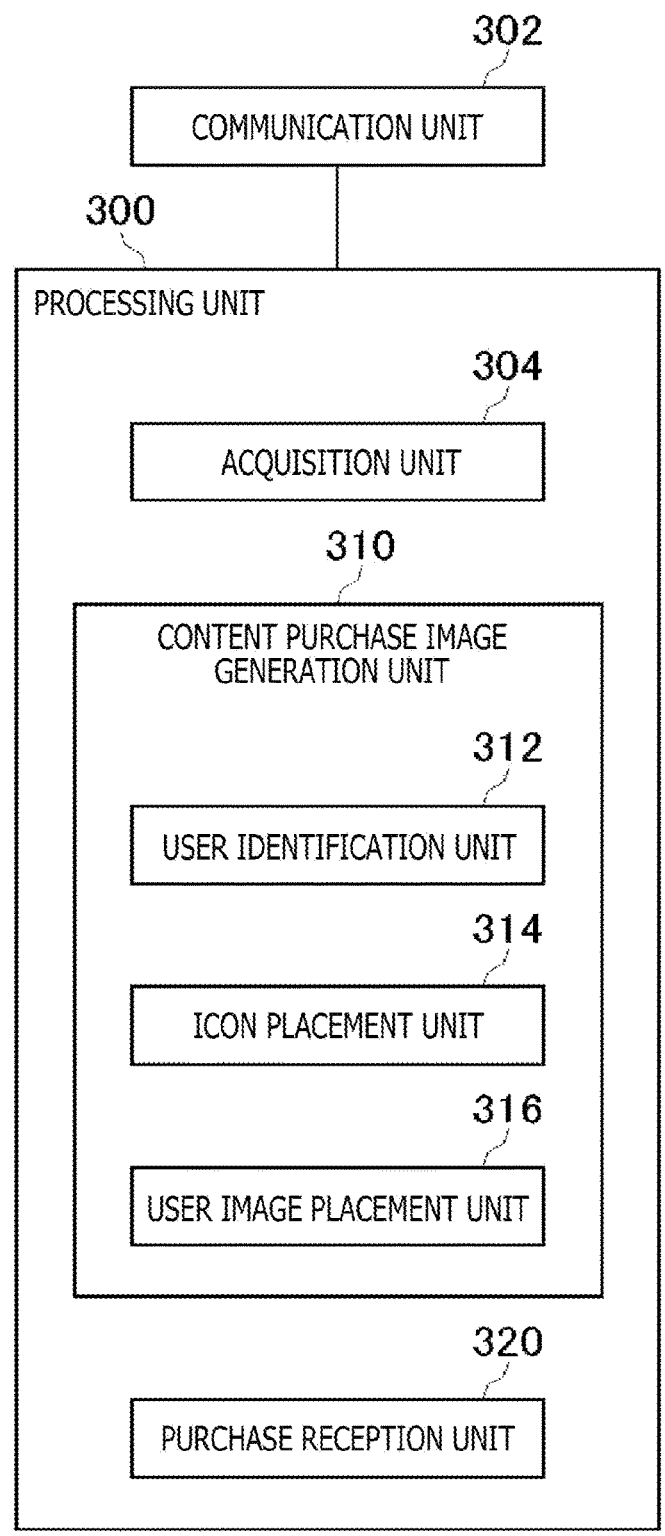
FIG. 9 is a functional block diagram of a content server.

FIG. 9 depicts functional blocks of the content server 14. The content server 14 includes a processing unit 300, and a communication unit 302. The processing unit 300 includes an acquisition unit 304, a content purchase image generation unit 310, and a purchase reception unit 320. The content purchase image generation unit 310 has a function of generating images of purchasable contents, includes a user identification unit 312, an icon placement unit 314, and a user image placement unit 316. The communication unit 302 exchanges information or data between the information processing device 10 and the management server 12. The content server 14 is an information processing device for providing users with contents. This content server 14 functions as an information processing device which places, on the periphery of the content icon, the images of friend users of the user A.

Responding to a request for a purchase screen, the content purchase image generation unit 310 generates image data of purchasable contents to be provided to the information processing device 10. The information processing device 10 acquires the image data of purchasable contents from the content server 14 and makes the output device 4 display thereon the content purchase screen. The content purchase screen generates an image including icons representing titles (game titles) of pieces of content that the user A can purchase.

When the user identification unit 312 identifies that the request for a purchase screen is sent from the information processing device 10 of the user A, the acquisition unit 304 acquires from the management server 12 the statuses of friend users of the user A. The status of a friend user may include a content purchase history in the past or a purchase reservation history.

The icon placement unit 314 places content icons on the purchasable-content image according to a predetermined format. The user image placement unit 316 places, on the periphery of the content icons, the images of friend users whose statuses acquired by the acquisition unit 304 are related to the content icons. More specifically, the icon placement unit 314 places the friend images of friend users who have purchased and/or have reserved to purchase the game whose title is identified by a content icon on the periphery of the content icon. This enables the user A to recognize at a glance that friend users have purchased the content or have reserved to purchase the content. When the user A selects the content, the purchase reception unit 320 receives the purchase or reservation of the content.

Figure 10:
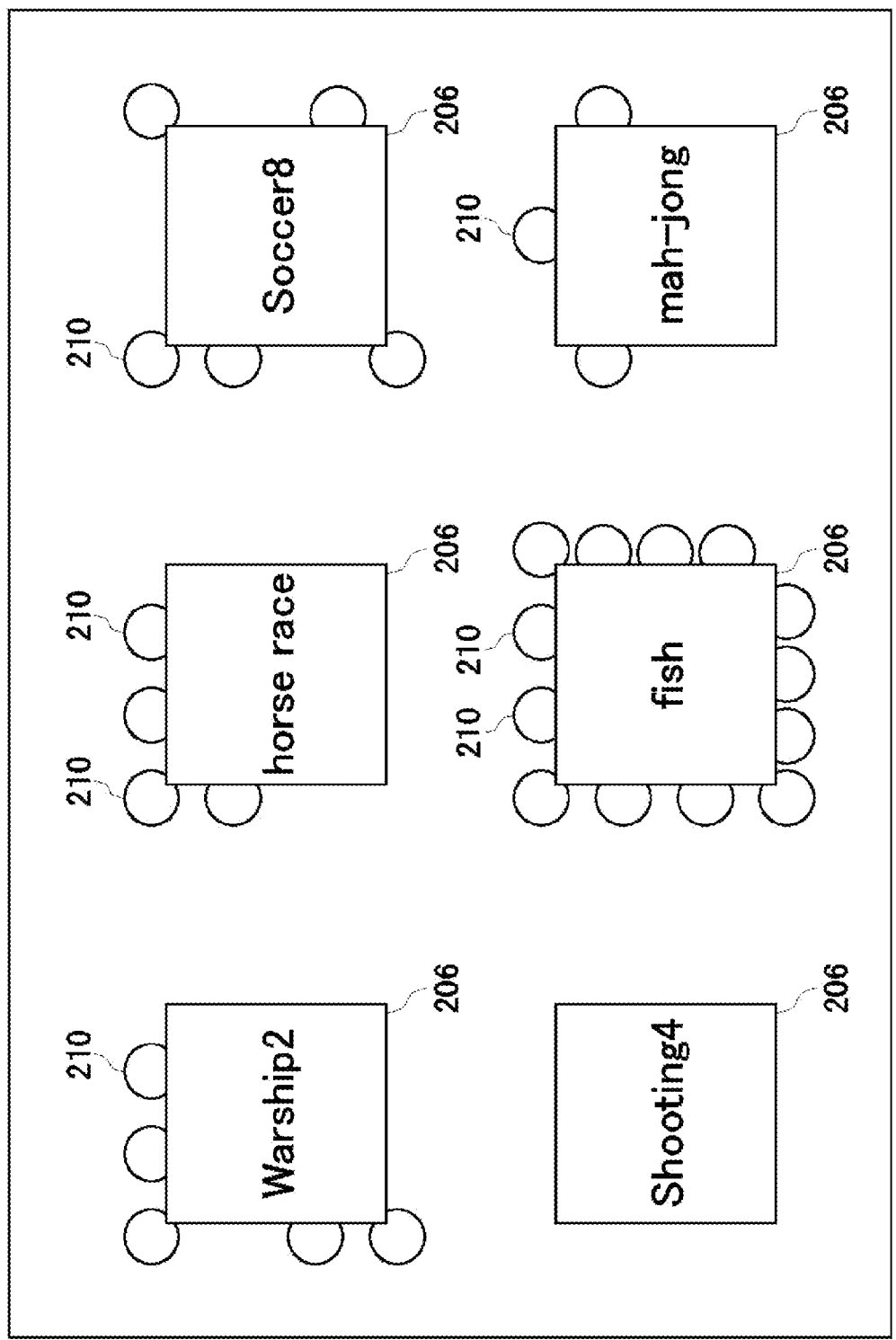
FIG. 10 depicts an example of a content purchase screen.

FIG. 10 depicts an example of the content purchase screen displayed by the output device 4. As depicted in FIG. 10, the friend images 210 of friends of the user A are placed on the periphery of purchasable content icons 206. This content purchase screen enables the user A to recognize contents popular among friend users at a glance.

The present invention has been thus described on the basis of the embodiment. This embodiment is a mere example, and various modified examples are possible by combining the components and the processes described in the embodiment. Those skilled in the art will understand that these modified examples are also in the scope of the present invention.

The friend images 210 are placed on the periphery of an icon in the embodiment; alternatively, however, the images of other users who are not friends of the user may also be placed.

INDUSTRIAL APPLICABILITY

The present invention is applicable to a field which provides a graphical user interface.

REFERENCE SIGNS LIST

1: Information processing system
4: Output device
6: Input device
10: Information processing device
12: Management server
14: Content server
16: Shared server
100: Processing unit
104: Acquisition unit
110: Menu image generation unit
112: Format acquisition unit
114: Icon placement unit
116: User image placement unit
118: Participation request transmission unit
132: Friend data storage unit
134: Game software storage unit
300: Processing unit
302: Communication unit
304: Acquisition unit
310: Content purchase image generation unit
312: User identification unit
314: Icon placement unit
316: User image placement unit
320: Purchase reception unit

The invention claimed is:

1. An information processing device, comprising:
circuitry configured to
acquire a status of each user from a server that manages statuses of a plurality of users, wherein the status includes an active status indicating a user of the plurality of users is currently executing an application;
generate an image including an icon for the application;
determine whether a number of the users with the active status to be displayed on a periphery of the icon exceeds a first predetermined number; and
place the first predetermined number of the user images of the users with the active status on the periphery of the icon, by not displaying the user images of the users with the active status exceeding the first predetermined number, in response to determining that the number of the user images of the users with the active status exceeds the first predetermined number, wherein
the circuitry calculates a closeness value of each of the plurality of users to an operation user who operates the information processing device, and
the circuitry is configured to determine the first predetermined number of the user images of the users to be placed on the periphery of the icon, and the user images of the users not to be placed on the periphery of the icon, based on the calculated closeness value, such that the user images of the user with higher closeness value is more preferentially displayed than the user images of the user with lower closeness value.

2. The information processing device according to claim 1,
wherein the circuitry acquires a relationship status of each of the plurality of users to an operation user who operates the information processing device.

3. The information processing device according to claim 2,
the circuitry places a user image on the periphery of the icon for a friend user with the active status based on the acquired relationship status, the friend user being a friend of the operation user.

4. The information processing device according to claim 3,
wherein the information processing device is a content server that provides a user with content,
the circuitry acquires from the server a content purchase history or a purchase reservation history of the friend user,
the circuitry generates an image including an icon of content available to the user, and
the circuitry places, on a periphery of the icon of the content, an image of the friend user who has purchased the content or has reserved to purchase the content.

5. The information processing device according to claim 3, wherein
the circuitry adjusts a size of the icon for the friend user according to a relationship between the operation user and the friend user.

6. The information processing device according to claim 5, wherein the circuitry adjusts the size of the icon for the friend user to be larger as a period of time in which the operation user and the friend user have played content together becomes longer.

7. The information processing device according to claim 5, wherein
the circuitry identifies the first predetermined number of the user images to be placed on the periphery of the icon based on the relationship.

8. The information processing device according to claim 1, wherein
the circuitry is configured to:
  group users executing the application together into a plurality of groups,
  control display of user images of users in a first group overlapping each other and the icon,
  control display of user images of users in a second group overlapping each other and the icon, and
  control display of the first group separately from the second group.

9. The information processing device according to claim 8, wherein
the circuitry places user images of friends not currently executing the application apart from the icon.

10. The information processing device according to claim 9, wherein
the friends not currently executing the application are watching a content of the application.

11. The information processing device according to claim 1, wherein
the application is a game application.

12. The information processing device according to claim 1, wherein
the circuitry places friend-related information in association with the icon for the friend user.

13. The information processing device according to claim 1, wherein
the friend-related information includes a message made by the friend user.

14. The information processing device according to claim 1, wherein
the circuitry determines whether the number of the users with the active status exceeds a second predetermined number, the second predetermined number being less than or equal to the first predetermined number, and
the circuitry places the second predetermined number of the friend-related information, by not displaying the friend-related information exceeding the second predetermined number, in response to determining that the number of the users with the active status exceeds the second predetermined number.

15. The information processing device according to claim 14, wherein
the second predetermined number is less than the first predetermined number.

16. The information processing device according to claim 1, wherein
the circuitry places the first predetermined number of the user images on the periphery of the icon, by overlapping at least a part of the user images to make at least more than half of each of the user images visible.

17. The information processing device according to claim 1, wherein
the circuitry calculates the closeness value based on a number of message exchanges between the operation user and the user, or a period of time in which the operation user and the user have played the application together.

18. An image generating method, comprising:
acquiring a status of each user from a server that manages statuses of a plurality of users, wherein the status includes an active status indicating a user of the plurality of users is currently executing an application;
generating, using circuitry, an image including an icon for the application;
determining, using the circuitry, whether a number of the users with the active status to be displayed on a periphery of the icon exceeds a first predetermined number; and
placing the first predetermined number of the user images of the users with the active status on the periphery of the icon, by not displaying the user images of the users with the active status exceeding the first predetermined number, in response to determining that the number of the user images of the users with the active status exceeds the first predetermined number,
wherein
the method further comprises
  calculating a closeness value of each of the plurality of users to an operation user who operates the information processing device, and
  determining the first predetermined number of the user images of the users to be placed on the periphery of the icon, and the user images of the users not to be placed on the periphery of the icon, based on the calculated closeness value, such that the user images of the user with higher closeness value is more preferentially displayed than the user images of the user with lower closeness value.

19. A non-transitory computer readable medium including executable instructions, which when executed by a computer cause the computer to execute an image generating method, the method comprising:
acquiring a status of each user from a server that manages statuses of a plurality of users, wherein the status includes an active status indicating a user of the plurality of users is currently executing an application;
generating an image including an icon for the application;
determining whether a number of the users with the active status to be displayed on a periphery of the icon exceeds a first predetermined number; and
placing the first predetermined number of the user images of the users with the active status on the periphery of the icon, by not displaying the user images of the users with the active status exceeding the first predetermined number, in response to determining that the number of the user images of the users with the active status exceeds the first predetermined number,
wherein
the method further comprises
  calculating a closeness value of each of the plurality of users to an operation user who operates the information processing device, and
  determining the first predetermined number of the user images of the users to be placed on the periphery of the icon, and the user images of the users not to be placed on the periphery of the icon, based on the calculated closeness value, such that the user images of the user with higher closeness value is more preferentially displayed than the user images of the user with lower closeness value.

* * * * *